Aug. 13, 1968 W. L. BOURLAND 3,397,116
DISTILLATION AND CONDENSATION SYSTEM FOR CONVERTING
SALT WATER TO FRESH WATER
Filed April 21, 1967 6 Sheets-Sheet 1
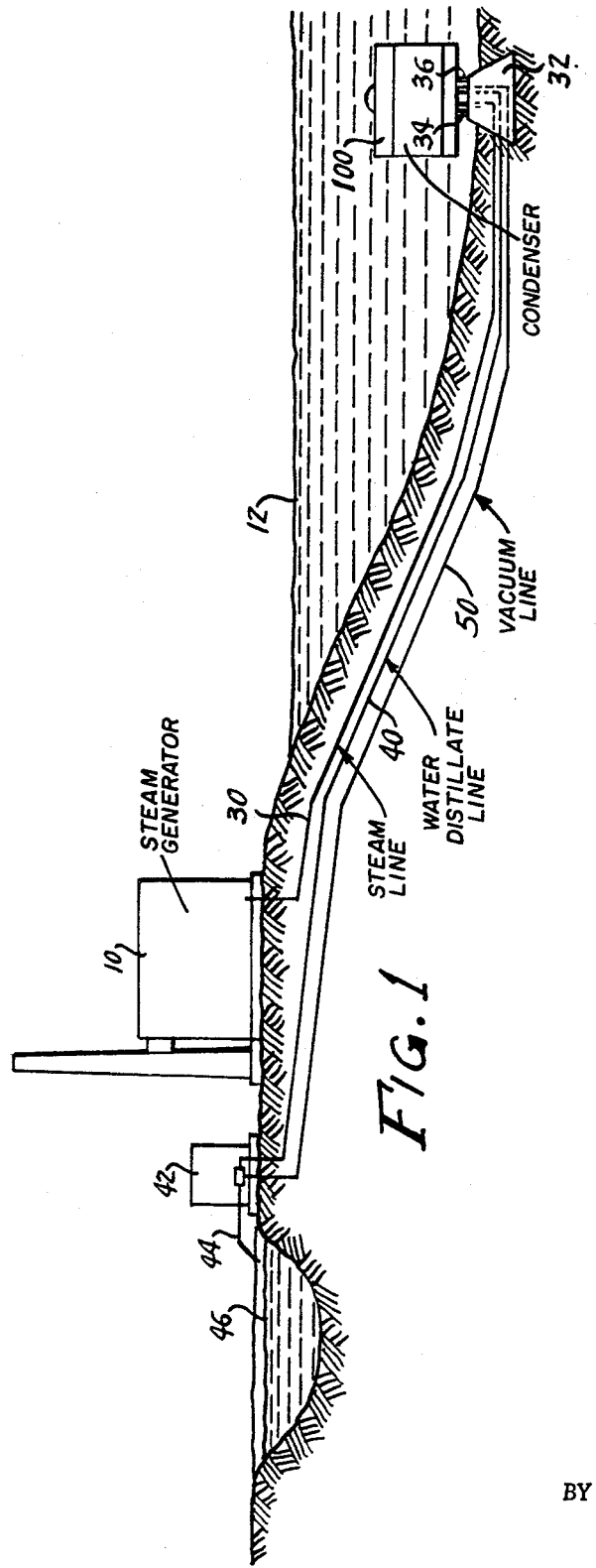
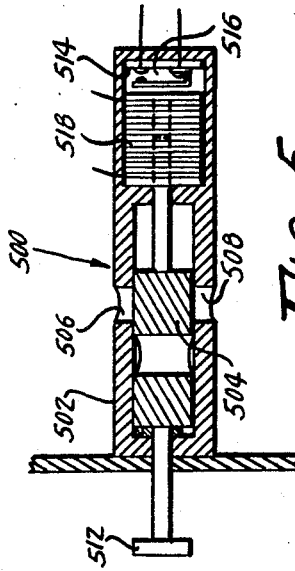
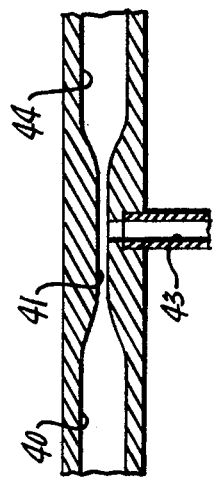
INVENTOR.
WILLIAM L. BOURLAND
BY Kimmel, Crowell & Weaver
ATTORNEYS.

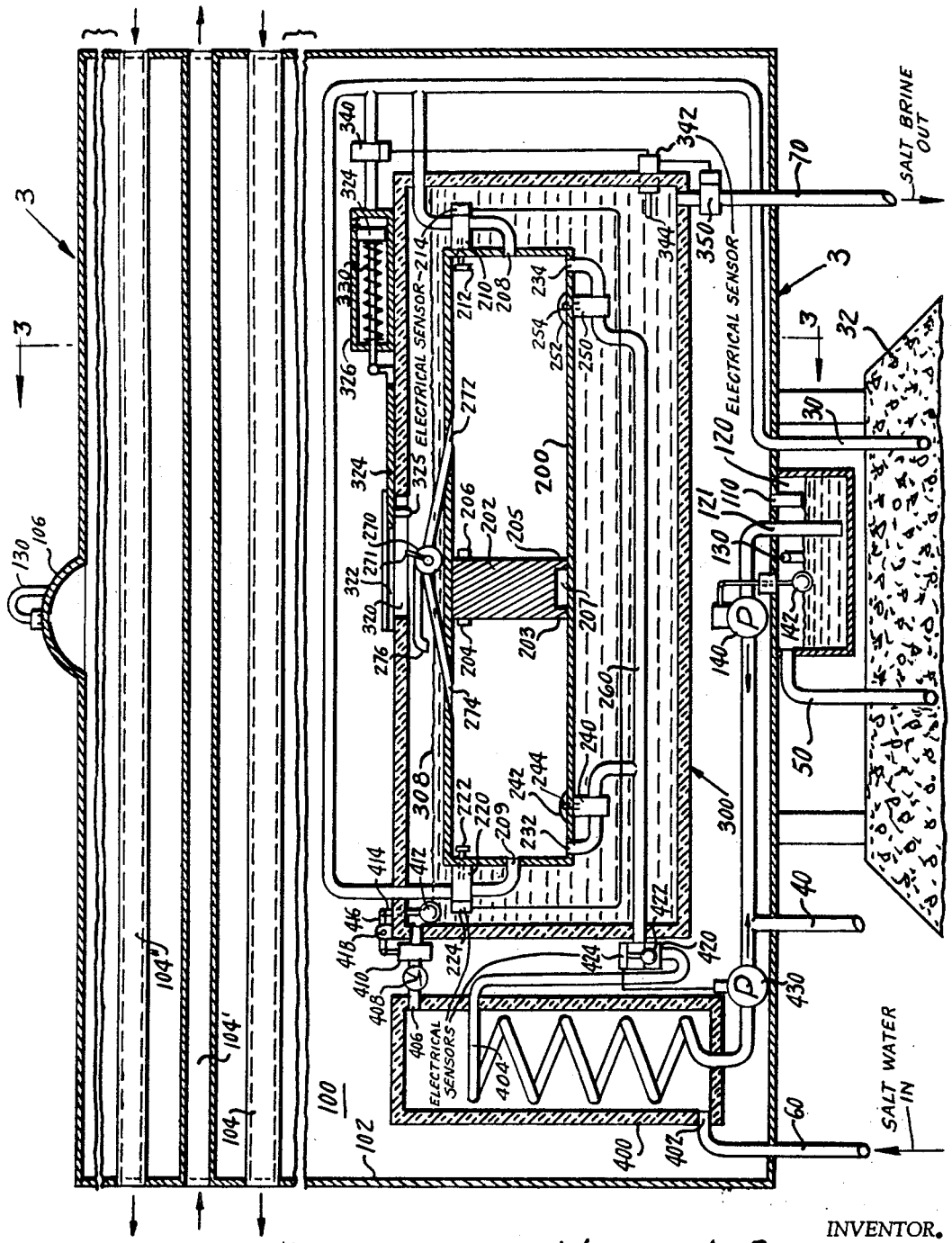

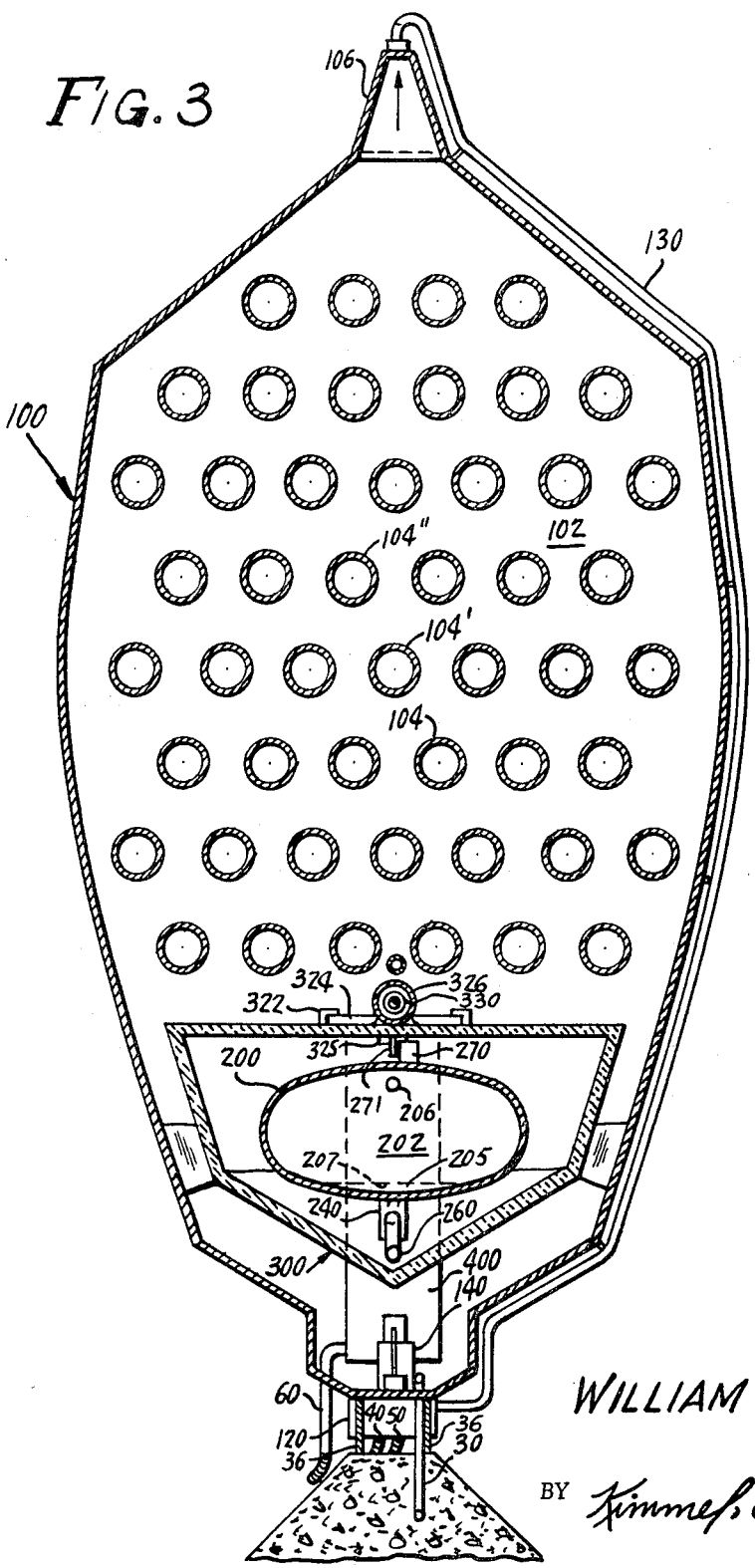

INVENTOR.
WILLIAM L. BOURLAND,
BY
Kimmel, Crowell & Weaver
ATTORNEYS.

Aug. 13, 1968

W. L. BOURLAND 3,397,116

DISTILLATION AND CONDENSATION SYSTEM FOR CONVERTING
SALT WATER TO FRESH WATER

Filed April 21, 1967

INVENTOR.
WILLIAM L. BOURLAND,
BY
Kimmel, Crowell & Weaver.
ATTORNEYS.

Aug. 13, 1968 W. L. BOURLAND 3,397,116
DISTILLATION AND CONDENSATION SYSTEM FOR CONVERTING
SALT WATER TO FRESH WATER
Filed April 21, 1967 6 Sheets-Sheet 6

INVENTOR.
WILLIAM L. BOURLAND,
BY
*Kimmel Crowell & Weaver.*
ATTORNEYS.

United States Patent Office 3,397,116
Patented Aug. 13, 1968

3,397,116
DISTILLATION AND CONDENSATION SYSTEM FOR CONVERTING SALT WATER TO FRESH WATER
William L. Bourland, North Highlands, Calif. (6350 Everest Way, Sacramento, Calif. 95842)
Continuation-in-part of application Ser. No. 544,013, Apr. 20, 1966. This application Apr. 21, 1967, Ser. No. 632,693
14 Claims. (Cl. 202—177)

ABSTRACT OF THE DISCLOSURE

A condensation system and method for the production of fresh water from salt water and the like which includes an outer vessel which is cooled to condense and collect vapors, a salt water containing vessel therein, a cylinder with a freely slidable piston inside the salt water containing vessel and electrical and fluid interconnection systems for supplying steam to the inside cylinder for moving the piston reciprocably therein and condensing the steam and thereby transferring the latent heat evaporization to the salt water to produce vapor therefrom which is condensed and collected in the outer vessel and conduit systems for the recovery of fresh water at all stages of one or more such systems is disclosed.

Cross-reference to related application

This is a continuation-in-part application of my co-pending application Ser. No. 544,013, filed Apr. 20, 1966.

Background of the invention

Field of the invention.—This invention relates to steam condensers and more particularly to steam condensation methods and systems for converting salt water, brackish water or polluted water to fresh water.

Description of the prior art.—A large variety of steam generation and condensation systems for the production of fresh water from salt water are known. One of the major problems in such systems relates to means and systems for prevention of scale or the removal of scale from the condenser parts. Many devices and systems have been proposed to solve this problem; however, no entirely satisfactory solution has been proposed. Flash evaporators are satisfactory for many purposes and are well known in the art but are low in efficiency especially where steam at a comparatively low temperature is available.

It is known that one of the most serious economic and technical problems facing the United States and many parts of the world relates to the providing of adequate supplies of fresh water for domestic, industrial and agricultural purposes. The problem of providing fresh water in adequate quantities and at a cost which is economically feasible is generally attacked from the point of view of providing larger low cost sources of energy for the production of steam. There are other approaches also to the solution of this serious problem, for example, selective freezing cycles and selective absorption procedures have been proposed. Much of the effort, however, is directed to finding cheaper sources of energy for the production of steam and much of this effort is wasted by inefficient methods and apparatus for the recovery of the energy imparted to the steam during the distillation process. Therefore, it is an object of this invention to provide apparatus and methods for high efficiency recovery of energy from steam and for the recovery of fresh water thereby.

Summary

The objects of this invention include the provision of apparatus for producing fresh water from steam directly and the utilization of the heat evaporization of such steam to produce additional fresh water;

The provision of apparatus for causing the expansion of steam and the condensation of such steam at substantially constant pressure and the recovery of the heat evaporization of such steam;

A process for the production of fresh water from steam for the recovery of heat evaporization of the steam by causing the steam to expand and condense at substantially constant pressure and to transfer the heat of condensation to a second body of water to provide additional steam and fresh water therefrom;

The provision of apparatus which is submersible in the ocean or another large body of water whereby it is possible to utilize the body of water as a heat sink in the condensation of steam in the production of fresh water;

The provision of a condenser in which the vapor is caused to expand at substantially constant pressure and to transfer the heat of vaporization released by the condensation of the vapor to a second volatile material for the production of an additional amount of vapor or of a different vapor and the recovery thereof;

The provision of apparatus in which a vapor is caused to expand at substantially constant pressure in a cylinder, the cylinder being provided with a freely slidably mounted plug which reciprocably moves in response to pressure exerted by the vapor;

The provision of apparatus and methods for the condensation of steam at less than atmospheric pressures and at relatively low temperatures to prevent the formation of scale;

The provision of systems of pluralities of condensers operating at selected pressures and temperatures dependent upon the source of steam to thereby prevent the formation of scale in such condensers; and The provision of systems and methods including pluralities of condensers operating from a common source of vacuum.

The above objects broadly encompass the purposes of the invention, however, additional objects reside in the specific constructions, combinations, elements and operating members as shown in the drawings and described hereinafter.

Specifically summarized, a system which may include one or more condensers each of which comprises an inner cylinder which has received therein a freely slidable piston, said cylinder being connected to a source of steam, said piston being reciprocably moved in said cylinder to condense and collect steam, said cylinder being immersed in a body of salt water whereby the latent heat of vaporization is transferred to the salt water to produce vapor therefrom. The vapor from the salt water is collected in a surrounding condensation vessel and condensed and collected therefrom. A plurality of such units may be interconnected into a system. In a preferred embodiment of the invention, the condensation takes place at reduced pressures and consequently at reduced temperatures to prevent the formation of scale on the condensers. In one embodiment the condensation takes place in the absence of exterior cooling of the outer chamber and the remaining steam is pressurized and passed to a second stage condenser wherein the same process is repeated and the steam is then passed on to a third condenser and so on as is necessary.

Brief description of the drawing

FIGURE 1 is a schematic view of the overall system for producing fresh water from salt water.

FIGURE 2 is a condenser which is submersible in a large body of water for utilizing the body of water as a heat sink and for condensing steam in a two stage condensation process.

FIGURE 2a is a detail cross-sectional view of the wall construction of the condenser.

FIGURE 3 is a vertical view of the apparatus of FIGURE 2 on a reduced scale and in partial cross section taken substantially along line 3—3 of FIGURE 2.

FIGURE 4 is a Venturi nozzle for producing a vacuum in the apparatus shown in FIGURE 2 and FIGURE 3.

FIGURE 5 is a valve of the type which may be used in this invention shown in cross section.

Description of the preferred embodiments

Figure 6:
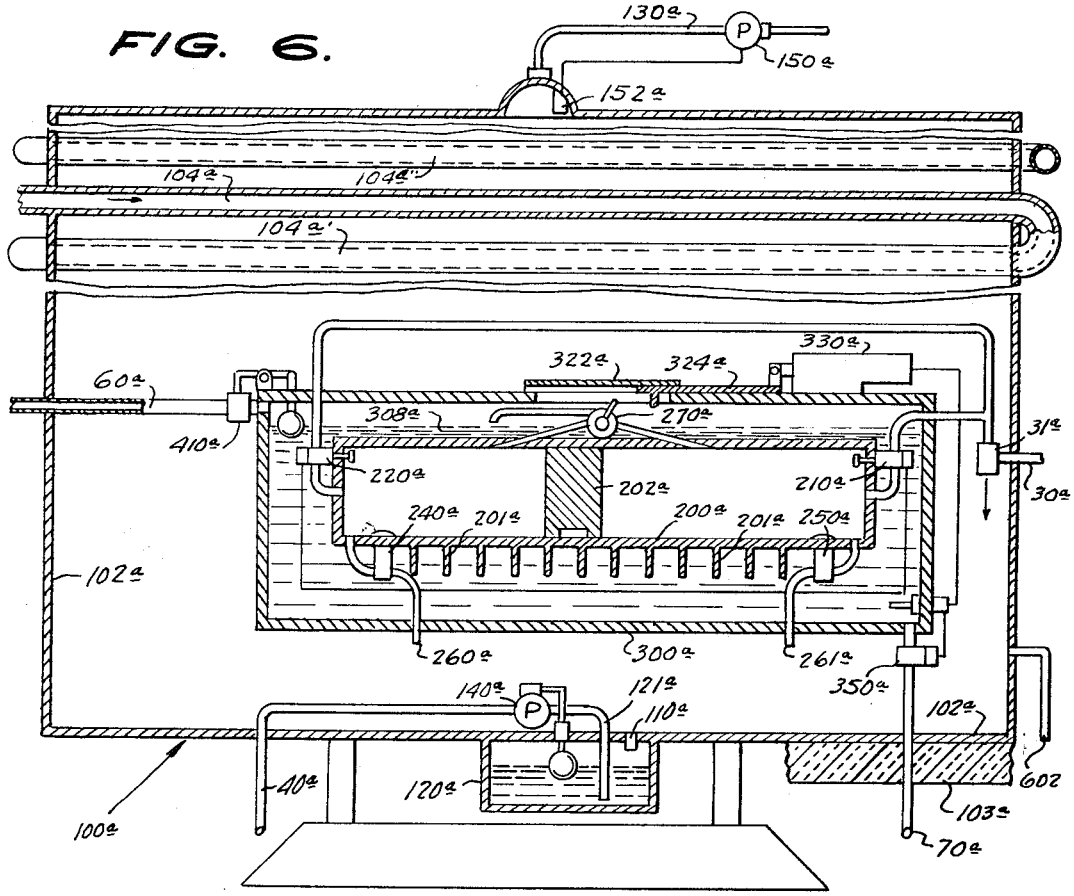
FIGURE 6 is a side elevational view in partial cross section of a modified embodiment of the condenser as shown in FIGURE 2.

Referring now to FIGURE 1, the system includes a steam plant 10. The steam plant may be of a conventional type, for example, it may use such fossil fuels as coal, oil, or gas. It may, in addition, be a nuclear powered steam plant of a type recently proposed. The nature of the steam plant is not important to this invention.

The steam plant in preferably located on the shore of a large body of water 12 which in a preferred embodiment may be a body of salt water such as the ocean. It is not an essential part of this invention, however, that the system be located on a large body of water since it would be possible to substitute the cooling of the body of water, as hereinafter described, by such conventional means as pumps, evaporators, and other equipment known to the art. In addition, the system of this invention may be utilized for producing fresh water from brackish water or from sewage.

Steam is carried by means of a line 30 to the condenser 100 of this invention which, in the preferred embodiment, is submerged in the body of water 12 and is anchored to the bottom thereof by an anchor member 32 which is attached to the condenser by cables 34 and 36. The condenser 100 because of its displacement tends to float and will therefore remain in the body of water above the anchor 32.

Fresh water from the condenser is returned by means of a pipe or conduit 40 to a collection station 42 and through pipe 44 to a fresh water reservoir 46. Of course it will be understood that there may be a plurality of condensers of the type described herein for a single steam plant. It will also be understood that the steam line 30 will be insulated in the conventional manner. In addition to lines 30 and 40 going to the condenser 100, there may be such other lines as are necessary, for example, the vacuum line 50, the function of which will be described hereinafter. Additional utility lines and power cables will be provided in the manner conventional to the art and are not shown on FIGURE 1 for purposes of clarity.

With reference now to FIGURE 2, the structure of the condenser 100 will be described. Steam enters the condenser from line 30, and fresh water leaves the condenser 100 through line 40, as shown in FIGURE 1. Vacuum line 50 is also connected to condenser 100 as will be described hereinafter. Two additional lines, a salt water intake line 60 and a salt water exhaust line 70, connect to the condenser 100. The interconnection and function of these lines will be described. Condenser 100 comprises in its major components a wall 102 and a plurality of cooling tubes 104 and a vapor collection dome 106. Included within the condenser is an elongate cylinder 200 enclosing a plug 202 which is slidably mounted within the cylinder 200 and which may reciprocably move within the cylinder when pressure is applied unequally to the two sides. Plug 202 carries on the opposing sides thereof operating members 204 and 206. Steam may enter the right end of the cylinder 200, as viewed in FIGURE 2, by a vent 208 through valve 210 when valve 210 is open. Valve 210 may be opened or closed by a slide operator 212. The position of slide operator 212 may selectively actuate electrical sensing device 214, the function of which will be described. Without further description it will be seen that when plug 202 moves to the extreme right of cylinder 200, operating member 206 contacts slide operator 212 on valve 210 and will cause valve 210 to open permitting steam to enter through vents 208. This exerts a pressure against the right side of plug 202 causing it to move to the left down cylinder 200.

Steam may also enter cylinder 200 at the left end, as viewed in FIGURE 2, through vent 209 to valve 220 which is actively opened and closed by slide operator 222 and which carries electrical sensor 224. It will be seen then that plug 202 may move reciprocably within cylinder 200 being moved, for example, first to the left by steam pressure entering from vents 208 until operating member 204 contacts slide operator 222 on valve 220 opening valve 222. The function of electrical sensors 214 and 224 is to electrically close valve 210 when valve 220 is opened by operating member 204 and, conversely, to close valve 222 when operating member 206 contacts slide operator 212 closing valve 210. Valves 210 and 220 remain in the open or closed position until operated either by operating members 204 or 206 or by electrical sensors 214 and 224. Electrical sensors 214 and 224 include solenoid operators and are of a type known to the art. An exemplary valve of this type is shown in FIGURE 5.

Fresh water, the condensate of the steam which enters cylinder 200, is removed through exit ports 232 and 234 and through valves 240 and 250 respectively. Valves 240 and 250 may be identical and are operated in response to the reciprocable movement of plug 202. As plug 202 moves to the left in cylinder 200 it will move over diaphragm cover 242 and operate a slide member 244 opening valve 240 in a manner similar to that described with respect to valves 210 and 220. The slide operator in valve 240, however, is spring biased in the upward direction holding it in a closed position until a downward force is exerted. Thus when plug 202 moves to the left, the downward edge 203 of plug 202 actuates slide operator 244 opening valve 240, but continued movement to the left of plug 202 causes the slide operator and the diaphragm cover to return to the upward position in recess 207 which is in the bottom of plug 202. At this point operating member 204 will contact slide operator 222 of valve 220 opening valve 220 and causing plug 202 to move to the right. The movement to the right of plug 202 causes momentary opening of valve 240 and forces any remaining condensate through exit port 232. Operation of valve 250 by a downward force exerted by the edge 205 of plug 202 on diaphragm cover 252 causes slide member 254 to open valve 250 causing the condensed fluid to exit through exit port 234 in the manner previously described with respect to exit port 232 and valve 240. The reciprocable movement of plug 202 in piston 200, then, is caused by alternately feeding steam to the respective ends of cylinder 200 and results in removing the condensate alternately from the ends of cylinder 200.

The reciprocable movement of plug 202 in cylinder 200 in response to the exertion of pressure by the steam results in the steam being expanded at substantially constant pressure. During the expansion at constant pressure, the steam condenses. Cooling is provided on the outside of the cylinder in a manner to be described. Apparatus is provided for carrying out the process of simultaneously expanding steam at constant pressure and condensing the steam at constant pressure and, as will be seen, transferring the heat vaporization to a second media.

In the preferred embodiment the cylinder 200 is elliptical in cross section. This shape has numerous advantages; for example, the use of an elliptical cylinder and elliptical plug slidably received therein stabilizes the plug's position so the valves can be actuated by certain accessories on the plug, for example, operating members 204 and 206. It will be understood, of course, that the valving arrangement and the entrance and exit arrangements for the steam and for the condensed fresh water are merely exemplary. Other valves may be substituted without departing from the intent and spirit of this invention. For example, purely mechanical slide valves could be substituted for valves 210 and 220 and a mechanical linkage could be provided between them. Similarly, mechanically operated slide valves of different nature or, valves actuated electrically or mechanically could be substituted for valves 210, 220, 240 and 250. The exact nature of the valves is not an essential part of this invention.

Similarly, the exact shape of the cylinder is not an absolutely essential part of this invention, however, an elliptical shaped cylinder is preferred.

Cylinder 200 is substantially enclosed in a vessel 300 which is preferably of a thick insulated wall structure, shown in FIGURE 2a. The wall structure may consist of an inner wall 302 and an outer wall 304 of corrosion resistant alloy, the intermediate space being filled with insulation 306. Vessel 300, during continuous operation, is normally filled to a level above the top of cylinder 200, the water level being shown at 308. Salt water enters the condenser 100 through pipe 60 and into a heat exchanger 400 which has a wall structure of the type described with respect to vessel 300. The salt water enters at port 402 and moves upwardly past heat exchange coils 404 and exits through exit port 406 to one-way valve 408 and a level control valve 410. Valve 410 is selectively opened in response to the water level in vessel 300 as sensed by float 412 which operates valve 410 by means of rod 414, leveler 416 which is pivotally connected at a fulcrum 418. When the water level falls below the desired point, float 412 moves out of the opening valve 410 permitting water to flow into vessel 300 to return the water level to a desired position. In a preferred embodiment, salt water may be obtained directly from the body of water in which the condenser 100 is immersed. For example, if cylinder 100 is immersed in the ocean or a body of salt or brackish water, all that is necessary is to provide an opening into pipe 60. It may be desirable to place the opening at a remote location for reasons which will be described later.

Heat is supplied to heat exchanger 400 by causing the condensate from cylinder 200 to flow through heat exchanger 400. The condensate is collected from valves 240 and 250 in line 260 and flows through valve 420 and through heat exchange coil 404 to pump 430 and then out line 40 to the fresh water reservoir. Valve 420 includes a float 422 which is responsive to the water level in the valve 420. Pump 430 is actuated when the water level in valve 420 reaches a predetermined level by means of electrical sensor 424. Electrical sensor 424 operates in a manner similar to that described with regard to valve 210 and valve 220, shown in FIGURE 5. It will be seen, then, that pump 430 will operate only when condensate, fresh water, is being supplied from cylinder 200. Vessel 300 is supplied with a port 320 and a flange 322 in which rides a cover 324 which may selectively be operated by a steam ram 326 which includes piston 328 which is spring biased to the right my means of spring 330. Steam ram 326 is operated and cover 324 closes vessel 300 when steam is applied through valve 340. Valve 340 is opened in response to a signal from condition responsive element 342, which has sensing elements thereon 344. Condition responsive element 342 also opens valve 350 to line 70. In the preferred embodiment condition responsive element 342 causes valves 340 and 350 to open when the salt concentration in the chamber reaches a predetermined level. Thus, when the salt concentration reaches a level where evaporation is no longer efficient, because of surface tension, condition responsive element 342 actuates valve 350 to open the dump line 70 from vessel 300 and valve 340 which closes the top of chamber 300 by means of cover 324. Cover 324 carries on it a downwardly extending protuberance 325 which operates valve 270 by moving handle 271, of valve 270, to the left, as shown in FIGURE 2. Movement to the left of handle 271 opens valve 270 permitting steam to flow from inlet 272 or 274 through valve 270 and out exit port 276 into chamber 300.

It will be apparent from the foregoing that an apparatus is provided for carrying out a process wherein steam is caused to expand and to condense at substantially constant pressure and the heat of vaporization released by the condensation of the steam at constant pressure is transferred to a material which is volatile or contains volatile components, for example, salt water. The salt water, in the preferred embodiment, is caused to heat up and to evaporate. The water vapor from the salt water leaves vessel 300 which selectively communicates with the vessel enclosed by walls 102. The water vapor is then condensed by contact with cooling tubes 104. The water condensate is collected in the bottom of condenser 100 and leaves vessel 100 through exit port 110, entering a vacuum trap 120. In the preferred embodiment the condenser 100 is operated at a partial vacuum to increase the efficiency of the condensation process. The vacuum is caused by exhausting condenser 100 through line 130 which is attached to the top of condenser 100 in vapor chamber 106. Pipe 130 enters trap 120 where the vapors carried past the cooling tubes 104 are condensed and trapped. The vacuum is provided by exhausting pipe 130 through line 50 by a vacuum pump which will be described. Fresh water which is produced by condensing the water vapor on cooling tube 104 and by condensing the vapors in line 130 is pumped from chamber 120 in pipe 121 to pump 140 which is selectively operated in response to float controller 142. The fresh water is pumped, by means of pump 140, from trap 120 to line 40 and returns to the fresh water storage system.

The arrangement of the vapor dome 106 is better shown in FIGURE 3. Line 130 carries vapors which are now condensed on cooling tubes 104 to trap 120 which is located at the bottom of condenser 100.

Vacuum for condenser 100 may be provided by a vacuum pump located in collecting station 42. While any desired vacuum pump may be used, it is convenient to use a Venturi vacuum pump to maintain a partial vacuum in condenser 100. Such a Venturi pump is shown in FIGURE 4. In a preferred embodiment it may be desirable to use fresh water from line 40 to operate the Venturi pump as the fresh water flows from left to right as shown in FIGURE 4, from line 40 through the throat 41 to line 44 and thence to reservoir 46; as shown in FIGURE 1, air, gas, and fluids in general are drawn inwardly at entrance port 43. By this means if any water vapor is not condensed by the time the vapors leave trap 120, as shown in FIGURES 2 and 3, they will be condensed on route to the pumping station or will be condensed upon contact with the now cool fresh water. Of course a rotary vacuum pump or a positive displacement pump may be used to provide the vacuum in place of the Venturi of FIGURE 4.

Referring now to FIGURE 5, a slide valve 400 consisting of a shell 502 and a closure member 504 and entrance and exit ports 506 and 508, respectively, is shown. Closure member 504 is operated at one end by slide operator 512 and at the other end by electrical sensor 514. The electrical sensor 514 includes sensing contacts 516 and an operating solenoid 518. The closure member 504 remains in the position shown until slide operator 512 is pushed to the right as shown in FIGURE 5 opening valve 500. Valve 500 then remains open until a current is applied to solenoid 518 causing closure member 504 to move again to the left in the position shown. When slide operator 512 is pushed to the right, sensing contacts 516 are temporarily closed giving a signal to a desired point. With reference to FIGURE 2 again, valve 500 is of the type which may be used as valves 210 and 220. Electrical distributing means are not shown in FIGURES 2 and 3 for purposes of clarity.

Reference is made now to FIGURE 6 which shows an alternative embodiment of condenser 100 which is designated generally as 100a. In condenser 100a the equivalent parts and components are designated the same as in FIGURE 2 with the addition of the letter a to distinguish the parts. Unless otherwise indicated, the parts are equivalent in the two embodiments.

Thus, in condenser 100a the steam enters through a pipe 30a, the entry of which is controlled by a valve 31a which may be adjusted or controlled to permit steam of a desired pressure to pass inwardly. The steam passes through valves 210a and 220a in the manner described previously. The cylinder 200a is substantially identical to the cylinder 200 with the exception that it may, in a preferred form, include a plurality of cooling fins 201a, to increase the efficiency of transfer of heat to the reservoir of salt water shown generally at 308a. In this embodiment, however, the fresh condensed water is removed through valves 240a and 250a and exit through the wall of vessel 300a and then directly in the outer vessel 100a. The water is collected through outlet 110a and is removed by means of pump 140a and line 40a. The salt water enters vessel 300a directly through line 60a and valve 410a.

In this embodiment also, the actuator for 324a is electrically operated as shown generally at 330a. This electrical actuator may be of the reciprocating solenoid type or may be a rotary electric motor with a rotary to linear motion converter or any other type of electrical actuator which ultimately produces a linear reciprocal motion. Since this constitutes no essential element of the invention it is not deemed necessary to describe it further.

In the embodiment as shown in FIGURE 6, the cooling water is pumped by conventional means inwardly through tube 104a and thence circulates through tubes 104a' and 104a'' rather than flowing simultaneously through the tubes. In addition, a thick layer of insulation 103a may be provided around cylinder 102a such as is partially shown in FIGURE 6. The remainder of the layer of insulation is omitted for clarity of illustration.

In this embodiment the pressure in the vessel 102a is held as low as is practicable. Evaporation temperature, for example, of around 100° F. or less in chamber 102a produces excellent efficiency and precludes the formation of scale. A vacuum pump is provided in the outlet line 130a of vessel 102a. The operation of vacuum pump 150a is controlled by a senser 152a which is in the condensing dome and which may sense either the pressure therein or the temperature therein to maintain the desired operating pressure in the vessel 102a. Thus, this maintains the pressure in 102a substantially below atmospheric pressure to permit low temperature condensation and to thereby prevent the formation of scale which would otherwise result. The brine from vessel 300a is removed through valve 350a to a closed tank 600 by conduit 70a. The pressure in tank 600 is maintained in equilibrium with the pressure in condenser 102a by a communicating line 602. The brine is collected in tank 600 until float 604 actuates pump 606 to remove the brine through conduit 608 and expel it through line 610 into a waste system.

Line 130a passes through a condensing tank 612 to condense any residual vapors in the line and communicates at 131a into a collection vessel wherein the condensed moisture is removed through a line 614 which is vented at 616. The fresh water from line 614, of course, will be fed into the overall recovery system by any conventional pipe or conduit means.

Figure 9:
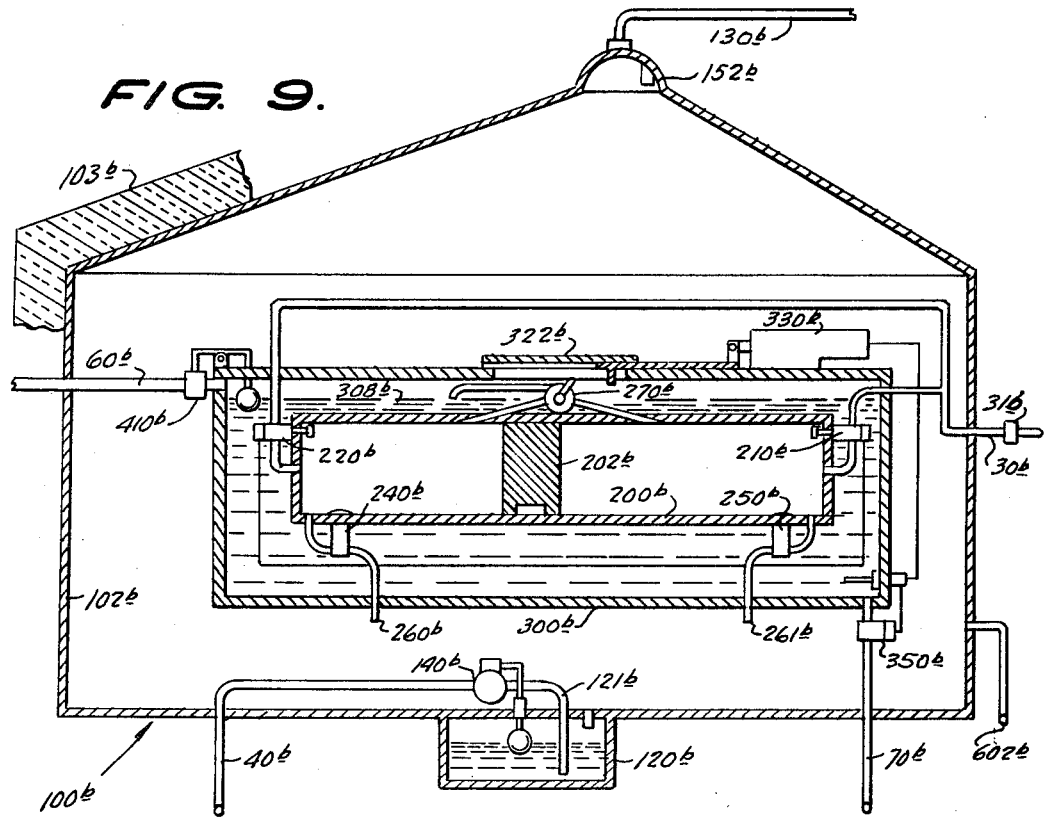
FIGURE 9 is a modified version of the condenser of FIGURE 6 in which the outer vessel is air cooled.

Reference is now made to FIGURE 9 which shows a drawing of a two stage condenser which operates the same as the one disclosed in FIGURE 6, except that no water cooling is provided in chamber 102b as with respect to condenser 100a, the components in condenser 100b, except as noted, are the same as disclosed with respect to condenser 100. In the embodiment of FIGURE 9, the condenser is preferably surrounded by an insulating layer 103b which is only partially shown so as to permit the other components to be more clearly illustrated. In this embodiment, the steam enters through line 30b and, as described, reciprocably moves the free floating piston 202b in cylinder 200b wherein the steam is condensed and the latent heat of vaporization is transferred to a body of water shown at 308b. The steam produced thereby passes into the outer chamber 102b and that portion which is condensed is collected in the collection tank 120b. The steam which is not condensed is pumped out through line 130b and, in a preferred system, passes to a water cooled condenser such as that shown in FIGURE 6 designated by 100a. If desired, the steam in line 130b may be pressurized by a conventional pump prior to its entry into the next stage of condensation. The overall system is described hereinafter. Any water condensed is carried out through line 40b in the manner previously described.

In addition, a brine tank 600 is provided for interconnection with condenser 100b in the manner previously described with respect to condenser 100a.

Figure 10:
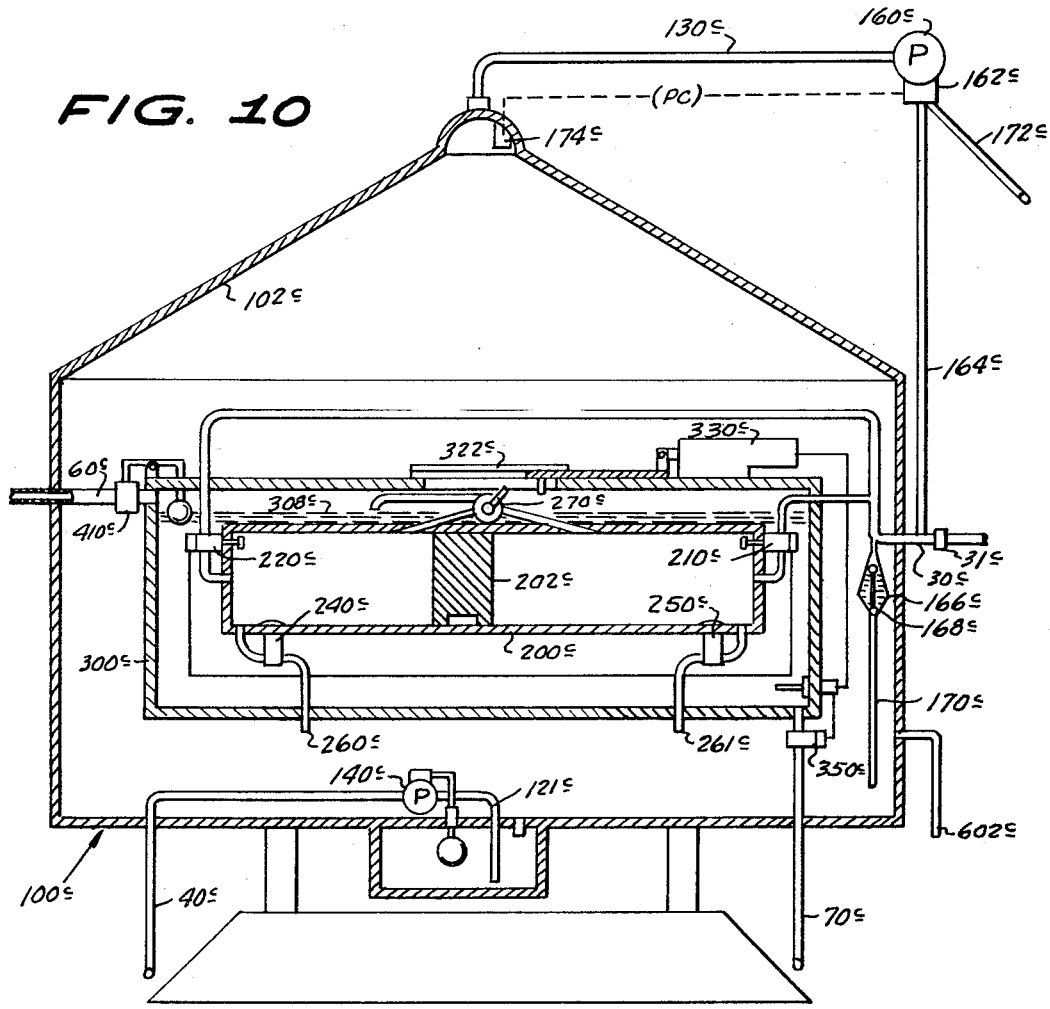
FIGURE 10 is a modified embodiment of the condenser of FIGURE 9.

Condenser 100c shown in FIGURE 10, is a two stage condenser that operates essentially the same as that shown in FIGURE 9. In this embodiment, the steam which enters from line 30c through valve 31c is condensed by reciprocating piston 202c in the same manner. However, the steam produced in the body of water designated as 308c is recirculated through the condensation system by means of a pump 160c which may return the steam at a higher pressure through a valve 162c and a conduit 164c to the inlet line 30c. There will be condensation as a result of the compression operation and the condensed water is collected in a hold-up tank 166c and intermittently released by means of a float valve 168c disposed therein. The condensate passes into the vessel 102c through conduit 170c. In a completely closed system of this type air locking would ultimately occur if the air and gases present in the steam are not exhausted from the system when they become excessive. The first indication of too much air in the system would be a rise in pressure in the line 30c and in 130c due to the elasticity of the air present in the cylinder. At this point it is desirable to vent the entire gas system and this is done by means of valve 162c and outlet conduit 172c. If desired, this may be done by a control 174c at timed intervals or according to a sensed physical property such as pressure or change in pressure, etc.

The valve comprising catch tank 166c and float 168c are merely exemplary of valves of this type and any valve which may operate generally equivalently will be satisfactory in this operation. Timed interval valves could also be used.

Figure 7:
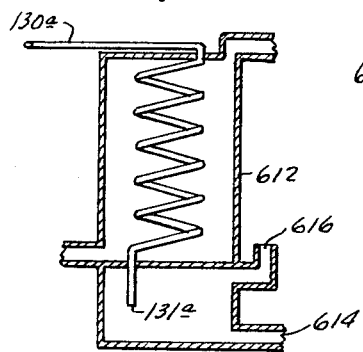
FIGURE 7 is a condensation tank interposed in a vacuum line extending from the condenser of FIGURE 6.
Figure 8:
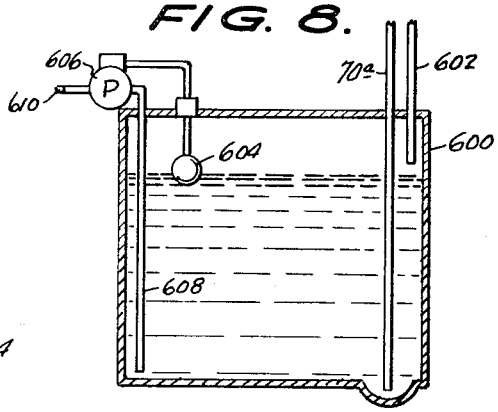
FIGURE 8 is a brine collection tank which is periodically dumped as will be described and which is connected to the condenser of FIGURE 6.
Figure 11:
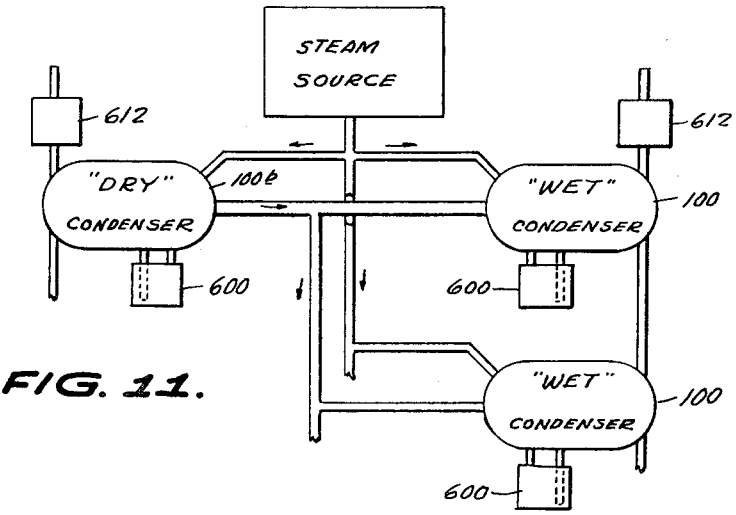
FIGURES 11 and 12 are diagrammatic of interconnection systems for a plurality of condensers of the type shown in the preceding figures.

In FIGURE 11, one type of interconnection which may desirably be used is illustrated. A source of steam which may be of any type is interconnected to a plurality of condensers. First, steam may be fed to a dry condenser of the type shown in FIGURE 9 and designated 100b. The brine is removed by the hold-up tank 600 in a manner previously described and the pressure is maintained in condenser 100b below atmosphere by a line extending through a condenser 612 of the type shown in FIGURE 7. The output of this condenser may then be fed to one or more wet condensers of the type designated as 100. In this configuration, two such condensers are used. It is also noted that additional steam is supplied from the steam source to each of these wet condensers to provide optimum operating efficiency. Again, the brine is removed through a tank 600 in each case and through either one condenser or a plurality of condensers indicated at 612 in the manner previously described. Obviously, other interconnection systems may be used depending on the particular circumstances and conditions of operation.

Figure 12:
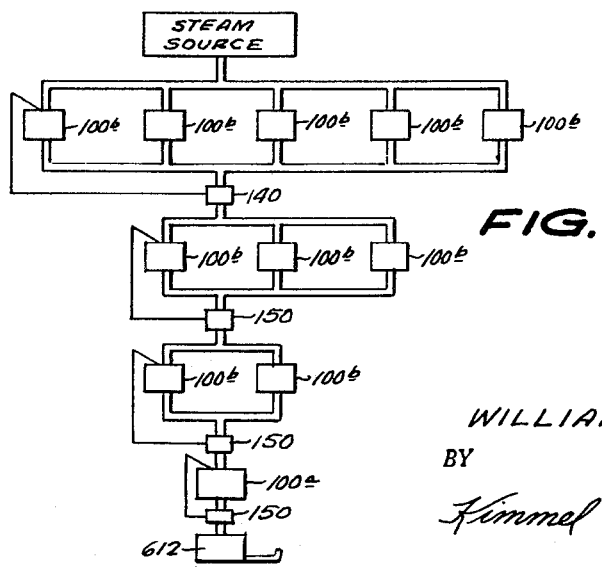

One such alternate interconnection is shown schematically in FIGURE 12. In this system, the steam source feeds in parallel, a plurality of dry condensers. In this configuration, five such dry condensers designated as 100b are fed from the steam source. The pressure in these condensers is maintained below atmosphere by a pump 150 and is controlled as previously described. The output of pump 150 is fed again to a plurality of dry condensers, this time three such condensers, designated as 100b which are connected in parallel. In a similar manner, pump 150 maintains the pressure in these condensers below atmospheric pressure. Again, the output of these condensers is fed to a pair of parallel connected dry condensers 100b and the output of these condensers is then ultimately fed to a wet condenser 100a to extract the last remaining fraction of heat energy in the steam. The output of pump 150 which maintains condenser 100a at a pressure less than atmosphere is passed through a condenser 612 to recover any steam still remaining, as previously described. In this manner, by using adequate insulation, virtually all the energy stored in the steam is recovered and a corresponding quantity of fresh water is produced therefrom.

It is important to realize that by this system the entire condensation of the steam may be carried out in a manner to prevent scale formation. Obviously, the reciprocable movement of the piston 202 prevents scale formation in the cylinder and the operation of the remaining system at a low pressure and low temperature, say below 160° Fahrenheit, prevents the formation of scale in the remaining portions of the condenser.

It is also important to recognize that while it would be physically possible to build individual condensers large enough to handle the entire output of a steam plant, it is highly desirable, in many circumstances, to provide rather than one large condenser a plurality of smaller condensers, such as shown in FIGURE 12, for optimum efficiency. Thus, each condenser which is operating will be operating at its maximum efficiency and if the steam supply becomes diminished to a point where all the condensers are not needed one of them can be cut out of the system with the remaining condensers operating at maximum capacity. This provides for complete flexibility without loss of efficiency. Furthermore, this permits individual condensers to be cut out of the system for periodic inspection and preventive maintenance and, when necessary, for repair.

It should also be understood that while approximately 160° Fahrenheit is a desirable operating temperature under most conditions the maximum temperature for operation and consequently the maximum pressure must be determined for each individual system. Obviously, it is desirable to operate the system at as high a temperature as it is possible without the formation of scale. The mineral or other content of the water being treated must be considered in determining the actual operating conditions.

Furthermore, it will be realized that it is possible to use highly purified water, such as distilled water which has been passed through ion exchange columns, etc. to remove all traces of mineral content therefrom in the boiler system and recirculating the condensed purified water from the cylinder to the boiler system. Since the entire heat content of the steam in the cylinder is transferred to the surrounding body of water as the piston reciprocates there is no loss of efficiency as a result of this double cycle.

The utilization of the steam at its maximum efficiency is provided by regenerating the steam to the desired pressure by pumps intermediate a set of cascaded condensers. Such a system is shown in FIGURE 12. This not only forces the steam into the condenser at an optimum pressure but provides for condensation at a lower temperature to prevent scaling in a preceding condenser or set of condensers.

An apparatus has been disclosed which permits the following process. A vapor may be condensed at substantially constant pressure with the heat of condensation being transferred to a volatile material. The volatile components of the material heated by the condensation of the vapor are then condensed and collected. While the process and the apparatus have been described with particularization to the distillation of salt water to produce fresh water, it is apparent that neither the process nor the apparatus is limited to this application. Thus the process may be used to condense any vapor to a liquid and may be used with reference to two separate materials where, for example, a first vapor is caused to condense at substantially constant perssure in the cylinder 200 while a second material is provided in vessel 300. In this case, the condensates of the vessel and the cylinder would not be combined. If, however, it is desirable, the same material may be used in cylinder 200 and vessel 300 and the combined condensate collected for use.

The apparatus and process are by no means limited to the production of fresh water from salt water, for example, fresh water may be produced from sewage water or from polluted water, however several important advantages are apparent with application to the production of fresh water from sea water. For example, the reciprocable movement of plug 202 in cylinder 200 maintains the heat exchange walls of cylinder 200 in a clean condition thereby promoting efficient transfer of heat through the walls. An inspection of the apparatus and a review of the process also reveals that essentially 100% of all the energy stored in steam is recovered. This recovery includes the very important heat of vaporization of the steam. It requires 540 calories to produce a gram of steam and in many distillation processes this latent heat of vaporization is wasted by permitting the steam to escape before condensation. The latent heat of vaporization, in the present process and apparatus, is transferred to a second body of volatile matter, salt water, where it causes further evaporation and subsequent condensation.

As illustrated in FIGURE 1, in the preferred embodiment the condenser is submerged; however, this is a desirable but not essential part of the invention. Other variations are possible without departing from the spirit of this invention; for example, the condition responsive sensing element 342 which, in the preferred embodiment, is sensitive to a salt concentration which may be sensitive to condensed steam, or other physical characteristics or to concentration of materials other than salt. In addition, while it is inconvenient it would theoretically be possible to carry out the process in other apparatus; for example, a chamber constructed of resilient material which would expand upon the application of pressure thereto. Such structures are inconvenient and impracticable however.

The drawing and specification illustrate a process and apparatus and a preferred embodiment of the invention and will suggest apparatus and methods which may be used in the apparatus and in the process without departing from the spirit thereof.

I claim:

1. In a system for producing fresh water from salt water or the like which includes a source of steam and a condenser system for collecting fresh water condensate, the improvement wherein the condenser system comprises: an enclosed elongate cylinder for receiving steam from said source; a mechanically free, independently movable, plug of a length less than one third the length of the cylinder and received in the cylinder in essentially fluid tight relation with the inner surface thereof; means connecting the steam source to the cylinder for supplying steam to the cylinder alternately at the respective ends thereof for causing the plug reciprocably to move in the cylinder, said last mentioned means including valve means operable by the plug for admitting steam into the cylinder as the plug approaches the respective ends of the cylinder; means including a conduit communicating with said cylinder at its opposite ends for removing steam condensate from the cylinder, valve means in said conduit operable by said plug to actuate the same as the plug approaches the respective ends of the cylinder to permit the condensate to flow from the cylinder to a collector; a vessel for maintaining a body of salt water in heat exchanging relation with the outer surface of the cylinder to absorb the heat released by condensation of steam in the cylinder; said cylinder being immersed in the body of salt water, means in said vessel for condensing steam produced by the heating of the body of salt water, and means for collecting the condensed steam produced by evaporation of the salt water body and passing the same to a collector.

2. The condenser of claim 1 wherein:
the cylinder is elliptical in cross-section and the plug is elliptical in cross-section for being slidably received in the cylinder.

3. The condenser of claim 1 wherein the vessel for maintaining a body of salt water in heat exchanging relation with the cylinder comprises:
a first vessel, having a closable opening therein, substantially enclosing the cylinder for maintaining the salt water in contact with the outer surface of the cylinder to receive the heat released by the condensation of the vapor in the cylinder.

4. The condenser of claim 3 further comprising:
a second vessel enclosing and in selective communicating relation with the first vessel to selectively receive steam from the salt water in the first vessel when said salt water is vaporized by receiving the heat released by the condensation of vapor in the cylinder.

5. The condenser of claim 4 further comprising:
means, including a valve, for selectively exhausting vapors from the cylinder into the first vessel;
a closure member for selectively opening and closing the opening in the first vessel, said opening permitting communication between the first vessel and the second vessel;
means on the closure member for selectively operating the valve for opening the valve when the closure member is closed to thereby communicate vapor from the cylinder to the first vessel; and
means operably connected with the closure member for draining the material from the first vessel when said vapors are communicated thereto from the cylinder.

6. The condenser of claim 4 wherein the first vessel has an opening therein for communication between the first vessel and the second vessel and further comprising:
sensing means in the first vessel;
a dump system for the first vessel including a valve for selectively draining the material therefrom;
means operably connected to the sensing means for opening the valve when the composition of the material in the first vessel reaches a predetermined condition;
a closure member of the opening in the first vessel;
means operably connected to the sensing means for moving the closure member to the closed position when said predetermined condition is reached; and
means including a valve disposed for selective operation by the closure means for passing vapor from the cylinder to the vessel when the material in the vessel reaches said predetermined condition to thereby forceably dump the contents of the first vessel therefrom by said vapor pressure.

7. The condenser of claim 6 further comprising:
vacuum pump means for maintaining the pressure in the second vessel below atmospheric pressure.

8. A condenser in a distillation system which comprises:
an enclosed elongate cylinder for receiving distillant vapor;
a plug of less than approximately one third the length of the cylinder received in the cylinder forming an essentially fluid tight seal with the inner surface thereof, said plug being mechanically free and independently movable in said cylinder;
a first vessel substantially enclosing the cylinder, said first vessel having a closable opening therein;
a second vessel substantially enclosing the first vessel, the closable opening in the first vessel permitting selective communication between said first vessel and said second vessel;
means for supplying vapor to the cylinder alternately at the respective ends thereof for reciprocably moving the plug in the cylinder in response to the relative vapor pressures on the respective sides of said plug;
valve means for alternately removing the condensate from the respective ends of said cylinder, said valve means being operable by reciprocation of the plug to remove the condensate from one end of the cylinder when said plug approaches said end for removing condensate from the other end of said cylinder when said plug approaches said other end thereof, said means being constructed to pass the condensate to the second vessel;
means for supplying distillant material to the first vessel;
means for maintaining the distillant material in the first vessel to a desired level;
means for selectively draining the distillant material from the first vessel; and
means for removing condensate from the second vessel.

9. The condenser of claim 8 wherein:
the means for supplying vapor to the cylinder comprises,
conduits in communication with the respective ends of the cylinder,
valves in the conduits,
means extending into the cylinder for actuation by the plug for opening each of said valves when said actuator is engaged by said plug, said conduits being in communication with a source of high pressure vapor;
the means for removing condensate from the cylinder comprises,
conduits in communication with the ends of the cylinder,
valves in said conduits for selectively opening and closing said conduits,
means in the cylinder for actuating said valves for opening the passage in a conduit at one end of the cylinder when said plug approaches said one end and for opening the passage in the conduit at the other end of said cylinder when said plug approaches said other end of said cylinder, and
pump means in communication with said conduits for withdrawing liquid from said cylinder through said conduits;

the means for supplying distillant to the first vessel comprises,
  a conduit in communication with the said first vessel and with a source of said distillant;
the means for maintaining the distillant at a desired level in the first vessel comprises,
  a valve in the last-named conduit, and
  sensing means in the first vessel for sensing the level of the distillant therein, said sensing means being operably connected to said valve for selectively opening said valve to permit entry of said distillant to maintain said distillant at a desired level in the first vessel;
the means for selectively removing the distillant from the first vessel comprises,
  means in the first vessel for sensing the composition of the distillant in said first vessel,
  a conduit in communication with said first vessel for passing liquid therefrom,
  a valve in the last-named conduit, said valve being operably connected with the last-named sensing means for being opened when the composition of the distillant in the first vessel reaches a predetermined condition,
  means for selectively closing the opening in the first vessel,
  control means operatively connected to the last-named sensing means for moving said closing means to the closed position when the composition of said distillant reaches said predetermined condition,
  a conduit system including a valve for passing vapor from the cylinder to the first vessel when said valve is open, and
  means on the closing means for opening said valve when said closing means is moved to the closed position and for closing said valve when said closing means is moved to the open position; and
the means for removing condensate from the second vessel comprises,
  a reservoir,
  means for passsing the condensate from the second vessel to the reservoir, and
  means for pumping the liquid from the reservoir.

10. The condenser of claim 8 further comprising: vacuum pump means for maintaining the pressure in the second vessel at less than atmospheric pressure.

11. The condenser of claim 10 wherein the vacuum pump means comprises a pump interconnected with said second vessel and with the cylinder for pumping the vapors from the second vessel to a higher pressure for passage into the cylinder.

12. The condenser of claim 11 further comprising: means for selectively removing accumulated gases from the second vessel for preventing recirculation thereof through the cylinder; and
means for condensing and collecting vapor condensate from the means for supplying vapor to the cylinder before such vapor passes into the cylinder.

13. In a salt water conversion plant for producing water of the type which includes a steam generator, a condenser, and a collection system, the improvement wherein the condenser comprises: a closed elongate cylinder; a mechanically free, independently movable, plug slidably received in the cylinder forming a seal with the inner surface thereof; means for alternately supplying steam to one end and then to the other end of the cylinder to cause the plug to reciprocably move while the steam in the cylinder is being condensed; means for removing the condensed steam alternately from the respective ends of the cylinder in response to the reciprocable motion of the plug in the cylinder; a first vessel substantially enclosing the cylinder; means for supplying salt water to the first vessel to cover the cylinder for absorbing the heat released by the condensation of the steam in the cylinder as the plug reciprocates in said cylinder, the heat released causing evaporation of a portion of the salt water in said first vessel; means for selectively maintaining salt water in the first vessel at a desired level; and means for selectively dumping the first vessel when the salt concentration in the salt water therein reaches a predetermined value.

14. The invention of claim 13 wherein the first vessel has a closable opening therein and further comprising:
a second vessel enclosing the first vessel, said second vessel being selectively in communication with the first vessel through said opening;
  cooling tubes in the second vessel for condensing vapors therein;
  means for selectively closing the opening in the first vessel for selectively preventing communication between said first vessel and said second vessel; and
  means for maintaining a partial vacuum in the second vessel.

References Cited

UNITED STATES PATENTS

| | | | |
|---|---|---|---|
| 2,185,595 | 1/1940 | Kleinschmidt | 202—187 X |
| 2,584,211 | 2/1952 | Kraft | 202—185 X |
| 2,625,506 | 1/1953 | Baer | 202—185.5 X |
| 2,696,465 | 12/1954 | Kittredge | 202—185 X |
| 2,760,919 | 8/1956 | Latham | 202—185 |
| 3,206,380 | 9/1965 | Davian | 202—185 |
| 3,290,229 | 12/1966 | Brown | 203—11 X |

FOREIGN PATENTS 811,474  4/1959  Great Britain.

OTHER REFERENCES

Mark's Mechanical Engineers Handbook (6th ed., 1958), sec. 9, pp. 56, 57 and 60.

NORMAN YUDKOFF, *Primary Examiner.*

F. E. DRUMMOND, *Assistant Examiner.*